US012752254B2

(12) United States Patent
Kang et al.

(10) Patent No.: US 12,752,254 B2
(45) Date of Patent: Oct. 6, 2026

(54) SUPER ABSORBENT POLYMER AND PREPARATION METHOD THEREOF

(71) Applicant: LG Chem, Ltd., Seoul (KR)

(72) Inventors: Soonhee Kang, Daejeon (KR); Seonjung Jung, Daejeon (KR); Hyungsam Choi, Daejeon (KR); Leehyeon Baek, Daejeon (KR); Ji Seok Lee, Daejeon (KR); Haesung Yun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 892 days.

(21) Appl. No.: 18/010,365

(22) PCT Filed: Mar. 17, 2022

(86) PCT No.: PCT/KR2022/003723
§ 371 (c)(1),
(2) Date: Dec. 14, 2022

(87) PCT Pub. No.: WO2022/197109
PCT Pub. Date: Sep. 22, 2022

(65) Prior Publication Data

US 2023/0264172 A1 Aug. 24, 2023

(30) Foreign Application Priority Data

Mar. 19, 2021 (KR) ........................ 10-2021-0036095
Mar. 16, 2022 (KR) ........................ 10-2022-0032857

(51) Int. Cl.
*C08F 220/06* (2006.01)
*A01N 37/40* (2006.01)
(Continued)

(52) U.S. Cl.
CPC ............ *B01J 20/267* (2013.01); *A01N 37/40* (2013.01); *A01P 1/00* (2021.08); *C08F 220/06* (2013.01);
(Continued)

(58) Field of Classification Search
None
See application file for complete search history.

(56) References Cited

U.S. PATENT DOCUMENTS

2017/0216815 A1 8/2017 Jang et al.
2019/0046682 A1 2/2019 Choi et al.
(Continued)

FOREIGN PATENT DOCUMENTS

CN 108239215 A 7/2018
CN 110028614 A 7/2019
(Continued)

OTHER PUBLICATIONS

Eun-Soo Park et al, "Antimicrobial activity of phenol and benzoic acid derivatives", International Biodeterioration & Biodegradation, vol. 47, No. 4, Jan. 1, 2001 (Jan. 1, 2001 ), pp. 209-214, XP055038115.
(Continued)

*Primary Examiner* — Sanza L. McClendon
(74) *Attorney, Agent, or Firm* — Lerner David LLP

(57) ABSTRACT

A super absorbent polymer capable of exhibiting improved bacterial growth-inhibitory property without lowering absorption performance, and a preparation method of the same. The super absorbent polymer is formed of an acrylic acid-based monomer containing acidic groups in which at least a portion of the acidic groups is neutralized; a polymerizable antimicrobial monomer represented by the disclosed Chemical Formula 1; and an internal cross-linking agent. The polymerizable antimicrobial monomer is included in the polymer in an amount of 0.2 to 20 parts by
(Continued)

weight based on 100 parts by weight of the acrylic acid-based monomer.

12 Claims, 1 Drawing Sheet

(51) Int. Cl.
*A01P 1/00* (2006.01)
*B01J 20/26* (2006.01)

(52) U.S. Cl.
CPC ...... *C08F 2800/20* (2013.01); *C08F 2810/20* (2013.01)

(56) References Cited

U.S. PATENT DOCUMENTS

| | | | |
|---|---|---|---|
| 2020/0115508 | A1 | 4/2020 | Lee et al. |
| 2022/0298280 | A1 | 9/2022 | Takahashi et al. |

FOREIGN PATENT DOCUMENTS

| | | | |
|---|---|---|---|
| CN | 110506074 | A | 11/2019 |
| JP | H09136808 | A | 5/1997 |
| JP | H09217268 | A | 8/1997 |
| JP | 2007327008 | A | 12/2007 |
| JP | 4261636 | B2 | 4/2009 |
| JP | 2014139288 | A | 7/2014 |
| JP | 2014210887 | A | 11/2014 |
| JP | 2020007257 | A | 1/2020 |
| KR | 100333972 | B1 | 4/2002 |
| KR | 20180073335 | A | 7/2018 |
| KR | 101926161 | B1 | 12/2018 |
| WO | 0071176 | A1 | 11/2000 |
| WO | 2018120056 | A1 | 7/2018 |
| WO | 2021010154 | A1 | 1/2021 |

OTHER PUBLICATIONS

Extended European Search Report for Application No. 22771775.8 dated Oct. 25, 2023. 9 pgs.

Search Report dated Aug. 1, 2023 from the Office Action for Chinese Application No. 202280004743.9 issued Aug. 4, 2023, 2 pages. [See p. 1, categorizing the cited references].

International Search Report for PCT/KR2022/003723 mailed Jun. 27, 2022. 4 pgs.

Boudreaux, C. J., W. C. Bunyard, and Charles L. McCormick. "Controlled activity polymers. XI Hydrolytic release studies of hydrophilic copolymers with labile esters of model allelopathic phenols." Journal of controlled release 44.2-3 (Feb. 1997): 185-194.

Schwalm, Reinhold, "UV Coatings: Basics, Recent Developments and New Applications", Elsevier Science (Dec. 2006). 3 pgs.

Odian, George, "Principles of polymerization", 2nd ed., Wiley-Interscience New York, Oct. 1981.3 pgs.

Search Report dated Mar. 29, 2024 from the Office Action for Chinese Application No. 202280004743.9 issued Mar. 30, 2024, 2 pages.

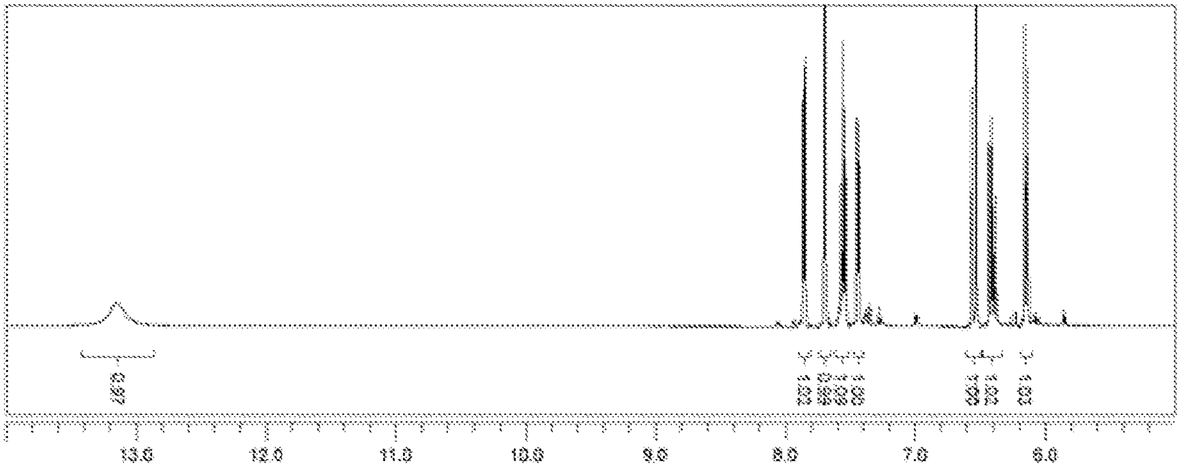
13.0
12.0
11.0
10.0
9.0
8.0
7.0
6.0

SUPER ABSORBENT POLYMER AND PREPARATION METHOD THEREOF

CROSS-RREFERENCE TO RELATED APPLICATION(S)

This application is a national phase entry under 35 U.S.C. § 371 of International Application No. PCT/KR2022/003723, filed on Mar. 17, 2022, which claims priority from This application claims the benefit of Korean Patent Applications No. 10-2021-0036095, filed on Mar. 19, 2021, and Korean Patent Application No. 10-2022-0032857, filed on Mar. 16, 2022, the disclosures of which are incorporated herein by reference in their entirety.

TECHNICAL FIELD

The present disclosure relates to a super absorbent polymer capable of exhibiting improved bacterial growth-inhibitory property without lowering absorption performance, and a preparation method of the same.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, etc., but also for water retaining soil products for gardening, water stop materials for the civil engineering and construction, sheets for raising seedling, fresh-keeping agents for food distribution fields, materials for poultices, or in the field of electrical insulation.

In particular, such a super absorbent polymer is most widely applied to hygienic products or disposable absorption products such as disposable diapers for children or adults. Therefore, when bacteria proliferate in these hygiene products and disposable absorption products, various diseases are induced, and even secondary odors can be caused, which is a problem. Accordingly, there have been attempts to introduce various bacterial growth-inhibiting components or deodorizing or antimicrobial components into super absorbent polymers.

However, in the attempts to introduce bacterial growth-inhibiting antimicrobial agents into super absorbent polymers, it is not easy to select and introduce antimicrobial agents which exhibit excellent bacterial growth-inhibitory and deodorizing properties while being harmless to the human body, meeting economic efficiency, and not deteriorating basic physical properties of the super absorbent polymers.

Accordingly, there is a continuous demand for the development of a super absorbent polymer-related technology which can exhibit excellent bacterial growth-inhibitory property without lowering basic physical properties of the super absorbent polymer.

DETAILED DESCRIPTION OF THE INVENTION

Technical Problem

Accordingly, there are provided a super absorbent polymer capable of exhibiting improved bacterial growth-inhibitory property without lowering absorption performance, and a preparation method of the same.

Technical Solution

According to one embodiment of the present disclosure, there is provided a super absorbent polymer including a polymer of an acrylic acid-based monomer containing acidic groups in which at least a portion of the acidic groups is neutralized; a polymerizable antimicrobial monomer represented by the following Chemical Formula 1; and an internal cross-linking agent, wherein the polymerizable antimicrobial monomer is included in the polymer in an amount of 0.2 to 20 parts by weight based on 100 parts by weight of the acrylic acid-based monomer:

[Chemical Formula 1]

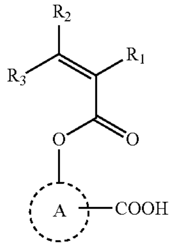

in the Chemical Formula 1, $R_1$ to $R_3$ are each independently hydrogen or methyl, and A is a substituted or unsubstituted C6 to C60 aromatic ring.

According to another embodiment of the present disclosure, there is provided a preparation method of a super absorbent polymer, including the steps of:

preparing a monomer composition by mixing an acrylic acid-based monomer containing an acidic group, a polymerizable antimicrobial monomer represented by the Chemical Formula 1, a basic material, an internal cross-linking agent, and a polymerization initiator;

forming a hydrogel polymer by performing thermal polymerization or photopolymerization on the monomer composition; and forming a super absorbent polymer containing a polymer by drying, pulverizing and classifying the hydrogel polymer, wherein the polymerizable antimicrobial monomer is used in an amount of 0.2 to 20 parts by weight based on 100 parts by weight of the acrylic acid-based monomer:

Further, according to another embodiment of the present disclosure, there is provided a hygienic product including the super absorbent polymer.

Advantageous Effects

The super absorbent polymer of the present disclosure may exhibit antimicrobial activity capable of inhibiting the growth of bacteria that are harmful to the human body and may cause secondary odor.

Specifically, as the super absorbent polymer is prepared by using a polymerizable antimicrobial monomer having a specific structure when forming a polymer, it exhibits antimicrobial activity against at least one of Gram-positive bacteria and Gram-negative bacteria. In addition, it can maintain excellent water retention capacity unlike the polymer of using other antimicrobial agents, and the used antimicrobial monomer does not remain in the polymer, so there is no stability problem in the human body caused by the elution of the antimicrobial agent.

Accordingly, the super absorbent polymer can be very preferably applied to various hygiene products such as diapers for children, and diapers for adults requiring antimicrobial activity against bacteria.

BRIEF DESCRIPTION OF THE DRAWINGS

FIG. 1 shows $^1$H NMR spectrum of the polymerizable antimicrobial monomer 1-1.

DETAILED DESCRIPTION OF THE EMBODIMENTS

The terminology used herein is for the purpose of describing particular embodiments only and is not intended to limit the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

Also, as used herein, when a layer or an element is mentioned to be formed "on" layers or elements, the layer or element may be directly formed on the layers or elements, or other layers or elements may be additionally formed between the layers, on a subject, or on a substrate.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In addition, the terminologies are used merely to refer to specific embodiments, and are not intended to restrict the present disclosure. Singular expressions of the present disclosure may include plural expressions unless they are differently expressed contextually.

Meanwhile, the terminology "(meth)acrylate" used herein includes both acrylate and methacrylate.

In the present disclosure, the alkyl group may be straight-chain, or branched-chain, and the carbon number thereof is not particularly limited, but is preferably 1 to 20. According to one embodiment, the carbon number of the alkyl group is 1 to 10. According to another embodiment, the carbon number of the alkyl group is 1 to 6. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are not limited thereto. Also, in the present disclosure, the above description of the alkyl group may be applied to alkylene, except that the alkylene is a divalent group.

The terminology "polymer" in the present disclosure is in a state in which an acrylic acid-based monomer is polymerized, and may include all moisture content ranges, or all particle diameter ranges. Among the polymers, a polymer having a moisture content of about 40 wt % or more after polymerization and before drying may be referred to as a hydrogel polymer, and particles in which the hydrogel polymer is pulverized and dried may be referred to as a cross-linked polymer.

In addition, the terminology "super absorbent polymer particle" refers to a particulate material containing a cross-linked polymer in which an acrylic acid-based monomer having at least partially neutralized acidic groups is polymerized and cross-linked by an internal cross-linking agent.

In addition, the terminology "super absorbent polymer" is used to encompass all of a polymer in which an acrylic acid-based monomer having at least partially neutralized acidic groups is polymerized or a base resin in the form of powder consisting of super absorbent polymer particles in which the polymer is pulverized, and the polymer or the base resin further processed, for example, surface cross-linking, fine reassembling, drying, pulverization, classification, etc., to be in a state suitable for commercialization, depending on the context.

In order to secure antimicrobial and deodorizing properties in conventional super absorbent polymers, a metal compound having an antimicrobial function or an organic compound containing a cation or an alcohol functional group was introduced in the form of an additive. However, in this case, the safety of the super absorbent polymer is deteriorated or basic physical properties such as absorption properties are lowered, and there are problems in the durability of the antimicrobial activity and the leakage of antimicrobial substances.

As an example, an attempt has been made to introduce an antimicrobial agent component containing antimicrobial metal ions such as silver, copper, copper, or zinc into a super absorbent polymer. These components containing antimicrobial metal ions destroy the cell walls of microorganisms such as bacteria, etc., and kill bacteria with enzymes that may cause odor in the super absorbent polymer, thereby imparting deodorant properties. However, the components containing the metal ions are classified as a BIOCIDE material which is able to kill even microorganisms beneficial to the human body. For this reason, when the super absorbent polymer is applied to hygienic products such as diapers for children or adults, etc., introduction of the antimicrobial agent component containing metal ions is excluded as much as possible.

In addition, when a bacterial growth-inhibiting antimicrobial agent is introduced into super absorbent polymers, a method of blending a small amount of the antimicrobial agent with the super absorbent polymers has been mainly applied. However, when this blending method is applied, it is practically difficult to uniformly maintain the bacterial growth-inhibitory property over time. Moreover, such a blending method may cause uneven coating and desorption of the antimicrobial agent component during a process of blending the super absorbent polymer with the antimicrobial agent and there are also disadvantages such as the need to install a new facility for blending.

In addition, there are various types of bacteria with more than 5,000 identified species. Specifically, the bacteria have various cell shapes such as a ball shape, a rod shape, a spiral shape, and the like, and the degree of demanding oxygen is also different for each bacterium, so that the bacteria are classified into aerobic bacteria, facultative bacteria and anaerobic bacteria. Therefore, it has not been easy for one type of antimicrobial agent to have a physical/chemical mechanism capable of damaging the cell membrane/cell wall of various bacteria or denaturing proteins.

However, it was confirmed that a super absorbent polymer prepared by polymerizing a monomer containing a carboxyl group having a specific structure together with an acrylic acid-based monomer could exhibit antimicrobial activity against at least one of Gram-positive bacteria and Gram-negative bacteria while exhibiting absorption performance above a certain level, thereby completing the present invention.

More specifically, when the polymerizable antimicrobial monomer represented by the Chemical Formula 1 is in contact with bacteria, an acidic condition is formed by dissociation of a carboxyl group (COOH) substituted in the ring A. Under the acidic condition, the bacteria may be affected by the structure and function of the cell membrane, and thus the growth of bacteria may be reduced. Accordingly, the super absorbent polymer including a polymer formed by the polymerizable antimicrobial monomer represented by the Chemical Formula 1 may exhibit antimicrobial activity against at least one of Gram-positive bacteria and Gram-negative bacteria.

Moreover, since the super absorbent polymer contains the antimicrobial monomer in the form of a cross-linked polymer together with the acrylic acid-based monomer, the antimicrobial monomer does not remain in the super absorbent polymer in the form of a compound. Therefore, there is no concern that the antimicrobial agent is eluted even with the lapse of time, and thus the super absorbent polymer exhibits excellent stability.

Hereinafter, a super absorbent polymer and a preparation method of the same according to specific embodiments of the present invention will be described in more detail.

Super Absorbent Polymer

Specifically, the super absorbent polymer according to one embodiment of the present disclosure includes a polymer of an acrylic acid-based monomer containing acidic groups in which at least a portion of the acidic groups is neutralized; a polymerizable antimicrobial monomer; and an internal cross-linking agent, wherein the polymerizable antimicrobial monomer is represented by the following Chemical Formula 1, at least some of the carboxyl groups (COOH) in the following Chemical Formula 1 are neutralized, and the polymerizable antimicrobial monomer is included in the polymer in an amount of 0.2 to 20 parts by weight based on 100 parts by weight of the acrylic acid-based monomer:

[Chemical Formula 1]

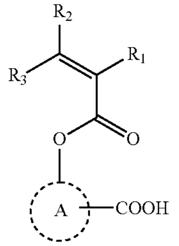

in the Chemical Formula 1, $R_1$ to $R_3$ are each independently hydrogen or methyl, and A is a substituted or unsubstituted C6 to C60 aromatic ring.

Herein, the polymer is obtained by performing cross-linking polymerization on the acrylic acid-based monomer and the polymerizable antimicrobial monomer in the presence of an internal cross-linking agent, and may have a three-dimensional network structure in which main chains formed by performing polymerization on the above monomers are cross-linked by the internal cross-linking agent. Therefore, the polymerizable antimicrobial monomer does not exist as a separate compound in the super absorbent polymer, but exists as a repeating unit constituting the main chain, so that it does not leak over time. Accordingly, the antimicrobial activity of the super absorbent polymer can be continuously maintained.

In addition, in the present disclosure, the polymerizable antimicrobial monomer may be understood to include all of the carboxylic acid compound represented by the Chemical Formula 1 and a carboxylate anion-containing compound represented by the Chemical Formula 1' in which the carboxylic acid compound represented by the Chemical Formula 1 is neutralized by a basic material. In other words, the polymerizable monomer has a structure in which at least some of the carboxyl groups (COOH) in the Chemical Formula 1 are neutralized.

[Chemical Formula 1']

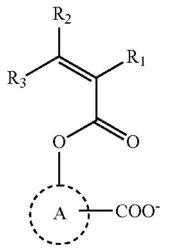

in the Chemical Formula 1', the description of each substituent is as defined in the Chemical Formula 1.

Accordingly, the polymer included in the super absorbent polymer includes an acidic group of the acrylic acid-based monomer, a substituent in which the acidic group of the acrylic acid-based monomer is neutralized by a basic material, a carboxyl group of the polymerizable antimicrobial monomer represented by the Chemical Formula 1, and a substituent in which the carboxyl group of the polymerizable antimicrobial monomer is neutralized. Specifically, the polymer includes all of a carboxyl group (COOH) of the acrylic acid monomer, a carboxylate group (COO—) in which the carboxyl group is neutralized, a carboxyl group (COOH) of the polymerizable antimicrobial monomer and a carboxylate group (COO—) in which the carboxyl group is neutralized. In this case, the anionic carboxylate group (COO—) may be ionically bonded to the cation of the basic material used for neutralization.

Herein, as the basic material capable of neutralizing the acrylic acid-based monomer and the polymerizable antimicrobial monomer, an alkali material such as sodium hydroxide, potassium hydroxide, and ammonium hydroxide may be used.

At this time, the degree of neutralization of the acrylic acid-based monomer, that is, the content (mol %) of the neutralized acrylic acid-based monomer based on the total moles of the acrylic acid-based monomer used in the preparation of the polymer may be 40 to 95 mol %, 40 to 80 mol %, or 45 to 75 mol %. In addition, the degree of neutralization of the polymerizable antimicrobial monomer, that is, the content (mol %) of the neutralized polymerizable antimicrobial monomer based on the total moles of the polymerizable antimicrobial monomer used in the preparation of the polymer may be 40 to 95 mol %, 40 to 80 mol %, or 45 to 75 mol %. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

As such, the polymer of the super absorbent polymer further includes a repeating unit derived from a polymerizable antimicrobial monomer having a carboxyl group (COOH) and a carboxylate group (COO—) in which the carboxyl group is neutralized in addition to the repeating unit derived from the acrylic acid-based monomer. Therefore, even if the polymerizable antimicrobial monomer is added, absorption performance of the super absorbent polymer may not be reduced, and antimicrobial activity may not be deteriorated even with the lapse of time because the leakage of the antimicrobial monomer is prevented.

Furthermore, the polymerizable antimicrobial monomer is included in the polymer in an amount of 0.2 to 20 parts by weight based on 100 parts by weight of the acrylic acid-based monomer. When the polymerizable antimicrobial monomer is included in an amount of less than 0.2 parts by weight based on 100 parts by weight of the acrylic acid-based monomer, it is difficult to exhibit sufficient antimicrobial activity. When the polymerizable antimicrobial monomer is included in an amount of more than 20 parts by weight based on 100 parts by weight of the acrylic acid-based monomer, absorption performance of the super absorbent polymer may be deteriorated. Specifically, the super absorbent polymer including more than 20 parts by weight of the polymerizable antimicrobial monomer in the polymer based on 100 parts by weight of the acrylic acid-based monomer exhibits centrifuge retention capacity (CRC) of less than 31 g/g, thereby having poor liquid retention capacity. Accordingly, it is not suitable for hygiene products.

More specifically, the polymerizable antimicrobial monomer may be included in the polymer in an amount of 0.2 parts by weight or more, 0.3 parts by weight or more, 0.4 parts by weight or more, or 0.5 parts by weight or more, and 20 parts by weight or less, 18 parts by weight or less, 15 parts by weight or less, 13 parts by weight or less, 10 parts by weight or less, 8 parts by weight or less, 5 parts by weight or less, 4 parts by weight or less, 3 parts by weight or less, or 2 parts by weight or less based on 100 parts by weight of the acrylic acid-based monomer. Herein, in terms of maintaining absorption performance of the super absorbent polymer such as centrifuge retention capacity, the polymerizable antimicrobial monomer is preferably included in an amount of 0.5 to 2 parts by weight based on 100 parts by weight of the acrylic acid-based monomer.

At this time, "the polymerizable antimicrobial monomer is included in the polymer in an amount of 0.2 to 20 parts by weight based on 100 parts by weight of the acrylic acid-based monomer" means that the polymerizable antimicrobial monomer is added in an amount of 0.2 to 20 parts by weight based on 100 parts by weight of the acrylic acid-based monomer in the preparation of the polymer. This can be confirmed by whether or not the antimicrobial monomer is detected when checking the residual monomer of the super absorbent polymer. Since the antimicrobial monomer was not detected in the super absorbent polymer after preparation, it could be seen that the entire amount of the antimicrobial monomer used was used for polymerization with the acrylic acid-based monomer.

In addition, in the Chemical Formula 1, A may be a C6 to C60 aromatic ring unsubstituted or substituted with at least one substituent selected from the group consisting of a C1 to C4 alkyl group, a hydroxyl group and a carboxyl group.

In one embodiment, A may be a C6 to C10 aromatic ring unsubstituted or substituted with at least one substituent selected from the group consisting of a C1 to C4 alkyl group, a hydroxyl group and a carboxyl group.

Specifically, A may be a benzene ring unsubstituted or substituted with at least one substituent, for example, one to five substituents, selected from the group consisting of a C1 to C4 alkyl group, a hydroxyl group and a carboxyl group.

For example, the polymerizable antimicrobial monomer may be any one selected from the group consisting of:

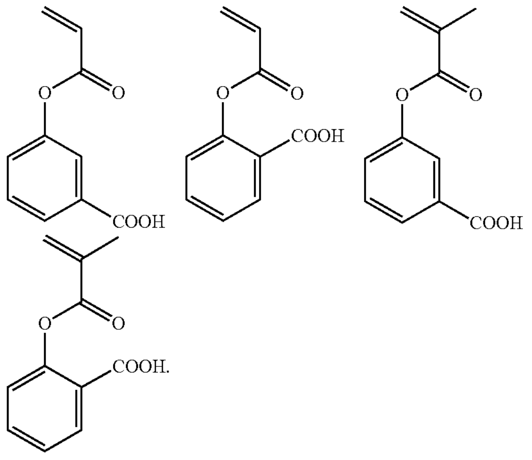

Meanwhile, the acrylic acid-based monomer is a compound represented by the following Chemical Formula 2:

R-COOM' [Chemical Formula 2]

in the Chemical Formula 2,

R is a C2 to C5 alkyl group having an unsaturated bond, and

M' is a hydrogen atom, a monovalent or divalent metal, an ammonium group, or an organic amine salt.

Preferably, the monomer may be at least one selected from the group consisting of (meth)acrylic acid, and a monovalent (alkali)metal salt, a divalent metal salt, an ammonium salt and an organic amine salt thereof.

As such, when (meth)acrylic acid and/or a salt thereof is used as the acrylic acid-based monomer, a super absorbent polymer with improved absorption performance can be obtained, which is preferable.

In addition, the terminology 'internal cross-linking agent' used herein is different from a surface cross-linking agent for cross-linking the surface of the super absorbent polymer particles to be described later, and the internal cross-linking agent polymerizes unsaturated bonds of the acrylic acid-based monomers and the polymerizable antimicrobial monomers by cross-linking. The cross-linking in the above step proceeds both on the surface and on the inside, but when the surface cross-linking process of the super absorbent polymer particles to be described later is in progress, the surface of the particles of the finally prepared super absorbent polymer has a structure cross-linked by a surface cross-linking agent, and the inside of the particles has a structure cross-linked by the internal cross-linking agent.

As the internal cross-linking agent, any compound may be used as long as it allows the introduction of cross-linking bonds during polymerization of the acrylic acid-based monomer. As a non-limiting example, the internal cross-linking agent may be a multifunctional cross-linking agent. Specifically, it may be N,N'-methylenebisacrylamide, trimethylolpropane tri(meth)acrylate, ethylene glycol di(meth) acrylate, polyethylene glycol (meth)acrylate, polyethylene glycol di(meth)acrylate, propylene glycol di(meth)acrylate, polypropylene glycol (meth)acrylate, butanediol di(meth) acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, pentaerythritol tetraacrylate, triarylamine, ethylene glycol diglycidyl ether, propylene glycol, glycerin, or ethylene carbonate, and theses may be used alone or in combination of two or more. However, the present disclosure is not limited thereto.

Preferably, the internal cross-linking agent may be a polyalkylene glycol di(meth)acrylate-based compound such as polyethylene glycol (meth)acrylate, polyethylene glycol di(meth)acrylate, propylene glycol di(meth)acrylate, or polypropylene glycol (meth)acrylate.

The cross-linking polymerization of the acrylic acid-based monomer in the presence of the internal cross-linking agent may be performed by thermal polymerization, photopolymerization or hybrid polymerization in the presence of a polymerization initiator with or without a thickener, a plasticizer, a preservation stabilizer, an antioxidant, etc., but the specific details will be described later.

In addition, the super absorbent polymer may be in the form of particles having a particle diameter of 850 μm or less, for example, about 150 to 850 μm. At this time, the particle diameter may be measured in accordance with the EDANA (European Disposables and Nonwovens Association) WSP 220.3. When the super absorbent polymer contains a large amount of fines having a particle diameter of less than 150 μm, various physical properties of the super absorbent polymer may be deteriorated, which is not preferable.

Meanwhile, the super absorbent polymer may further include a surface cross-linked layer formed by further cross-linking the polymer using a surface cross-linking agent on the polymer. This is to increase the surface cross-linking density of the super absorbent polymer particles. As described above, when the super absorbent polymer particles further include a surface cross-linked layer, they have a structure having a higher cross-linking density on the outside than on the inside.

As the surface cross-linking agent, any surface cross-linking agent that has been conventionally used in the preparation of a super absorbent polymer may be used without any particular limitation. Examples of the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; at least one carbonate-based compound selected from the group consisting of ethylene carbonate, propylene carbonate, and glycerol carbonate; an epoxy compound such as ethylene glycol diglycidyl ether; an oxazoline compound such as oxazolidinone; a polyamine compound; an oxazoline compound; a mono-, di- or poly-oxazolidinone compound; a cyclic urea compound; and the like.

Specifically, one or more, two or more, or three or more of the above-mentioned surface cross-linking agents may be used as the surface cross-linking agent, for example, ethylene carbonate-propylene carbonate (ECPC), propylene glycol and/or glycerol carbonate may be used.

Meanwhile, as described above, the super absorbent polymer may exhibit antimicrobial activity against at least one of Gram-negative bacteria and Gram-positive bacteria. More specifically, the super absorbent polymer may exhibit antimicrobial activity against one or more types of bacteria classified as Gram-positive bacteria. Alternatively, the super absorbent polymer may exhibit antimicrobial activity against one or more types of bacteria classified as Gram-negative bacteria. Alternatively, the super absorbent polymer may exhibit antimicrobial activity against one or more types of bacteria classified as Gram-negative bacteria and one or more types of bacteria classified as Gram-positive bacteria.

Herein, the meaning of "exhibiting antimicrobial activity against specific bacteria" is that the number of bacteria, which is obtained by absorbing synthetic urine inoculated with test bacteria into the super absorbent resin for which antimicrobial activity is to be confirmed, followed by incubation, was significantly reduced compared to the number of reference bacteria, which is obtained by absorbing synthetic urine inoculated with test bacteria into the super absorbent resin containing no antimicrobial substance. Specifically, it means that the bacteriostatic reduction rate (%) calculated by the following Equation 1 according to the antimicrobial activity test to be described later is 50% or more.

$$\text{Bacteriostatic reduction rate } (\%) = \left(1 - \frac{C_{sample}}{C_{Reference}}\right) \times 100 \qquad \text{[Equation 1]}$$

in the above Equation, $C_{sample}$ is a concentration of microorganisms (Co) in the culture medium of the super absorbent polymer containing bacteriostatic substances, and $C_{Reference}$ is a concentration of microorganisms (Co) in the culture medium of the super absorbent polymer of Comparative Example 1 containing no bacteriostatic substance.

More preferably, "exhibiting antimicrobial activity against specific bacteria" means that the bacteriostatic reduction rate (%) calculated by the Equation 1 is 60% or more, 70% or more, 80% or more, 90% or more, 95% or more, or 99% or more.

The Gram-positive bacteria is a generic term for bacteria that are stained purple when stained by the Gram staining method. The cell wall of the Gram-positive bacteria is composed of several layers of peptidoglycan. Thus, even when the Gram-positive bacteria are stained with a basic dye such as crystal violet and treated with ethanol, they display purple without discoloration. Bacteria classified as such Gram-positive bacteria include *Enterococcus faecalis, Staphylococcus aureus, Streptococcus pneumoniae, Enterococcus faecium, Lactobacillus lactis*, and the like.

In addition, the Gram-negative bacteria is a generic term for bacteria that are stained red when stained by the Gram staining method. The Gram-negative bacteria have an outer membrane composed of lipopolysaccharides, lipoproteins, and other complex polymer substances instead of a cell wall having a relatively small amount of peptidoglycan compared to the Gram-positive bacteria. Accordingly, when the Gram-negative bacteria are stained with a basic dye such as crystal violet and treated with ethanol, discoloration occurs, and when counterstained with a red dye such as safranin, a red color is displayed. Bacteria classified as such Gram-negative bacteria include *Proteus mirabilis, Escherichia coli, Salmonella typhi, Pseudomonas aeruginosa, Vibrio cholerae*, and the like.

The Gram-positive and Gram-negative bacteria may cause various diseases upon contact, and may also cause secondary infection in severe patients with weakened immunity. Therefore, it is preferable to use one antimicrobial agent to exhibit antimicrobial activity against both the Gram-positive and Gram-negative bacteria.

Preferably, the super absorbent polymer may exhibit antimicrobial activity against both the Gram-negative and Gram-positive bacteria. Herein, the Gram-negative bacteria in which the super absorbent polymer exhibits antimicrobial activity may be *Proteus mirabilis* or *Escherichia coli*, and the Gram-positive bacteria may be *Enterococcus faecalis*, but the present disclosure is not limited thereto.

Specifically, the super absorbent polymer may have centrifuge retention capacity (CRC) to saline (0.9 wt % aqueous solution of sodium chloride) for 30 minutes measured in accordance with the EDANA WSP 241.3 of 31 to 40 g/g. When the centrifuge retention capacity (CRC) is less than 31 g/g, liquid retention capacity is deteriorated, so that the super absorbent polymer is not suitable for hygiene products. More specifically, the super absorbent polymer may have centrifuge retention capacity (CRC) of 31 g/g or more, 32 g/g or more, 33 g/g or more, 34 g/g or more, or 35 g/g or more, and 40 g/g or less, 39 g/g or less, 38 g/g or less, or 37 g/g or less.

Accordingly, the above-described super absorbent polymer containing a polymerizable antimicrobial monomer in the polymer in a predetermined amount may exhibit excellent antimicrobial activity while having the centrifuge retention capacity (CRC) of 31 to 40 g/g.

Preparation Method of Super Absorbent Polymer

Meanwhile, the super absorbent polymer may be prepared by the following preparation method including the steps of:

preparing a monomer composition by mixing an acrylic acid-based monomer containing an acidic group, a polymerizable antimicrobial monomer represented by the following Chemical Formula 1, a basic material, an internal cross-linking agent, and a polymerization initiator (step 1);

forming a hydrogel polymer by performing thermal polymerization or photopolymerization of the monomer composition (step 2); and forming a super absorbent polymer containing a polymer by drying, pulverizing and classifying the hydrogel polymer (step 3).

At this time, the polymerizable antimicrobial monomer is used in an amount of 0.2 to 20 parts by weight based on 100 parts by weight of the acrylic acid-based monomer so that it is included in the polymer of the final prepared super absorbent polymer in an amount of 0.2 to 20 parts by weight based on 100 parts by weight of the acrylic acid-based monomer.

First, in order to prepare the super absorbent polymer of one embodiment, step 1 of preparing a monomer composition by mixing an acrylic acid-based monomer containing an acidic group, a polymerizable antimicrobial monomer represented by the Chemical Formula 1, a basic material, an internal cross-linking agent, and a polymerization initiator is performed.

For details on the acrylic acid-based monomer, the polymerizable antimicrobial monomer, the basic material, and the internal cross-linking agent, refer to the above. In step 1, some of the acidic groups of the acrylic acid-based monomer and some of the carboxyl groups of the polymerizable antimicrobial monomer are neutralized by mixing with a basic material. Accordingly, the monomer composition may include an acrylic acid-based monomer having at least partially neutralized acidic groups and a polymerizable antimicrobial monomer having at least partially neutralized carboxyl groups (COOH) in Chemical Formula 1.

At this time, the degree of neutralization of the acrylic acid-based monomer and the polymerizable antimicrobial monomer in the monomer composition may each independently be 40 to 95 mol % as described above. To this end, the basic material may be used in the monomer composition in an amount of about 0.4 mol to about 0.95 mol based on 1 mol of the acrylic acid-based monomer. In addition, the basic material may be added to the monomer composition in the form of an aqueous solution dissolved in water.

In addition, the internal cross-linking agent may be included in the monomer composition in an amount of 0.01 to 1 parts by weight based on 100 parts by weight of the acrylic acid-based monomer to cross-link the polymerized polymer. When the internal cross-linking agent is included in an amount of less than 0.01 parts by weight, improvement by the cross-linking is insignificant, and when the internal cross-linking agent is included in an amount of more than 1 parts by weight, absorbency of the super absorbent polymer may be reduced. More specifically, the internal cross-linking agent may be included in an amount of 0.05 parts by weight or more, or 0.1 parts by weight or more, and 0.5 parts by weight or less, or 0.3 parts by weight or less based on 100 parts by weight of the acrylic acid-based monomer.

In addition, the polymerization initiator may be properly selected depending on the polymerization method. In the case of a thermal polymerization, a thermal polymerization initiator is used, and in the case of a photopolymerization, a photopolymerization initiator is used. Further, in the case of a hybrid polymerization method (a method using both heat and light), all of the thermal polymerization initiator and the photopolymerization initiator can be used. However, even by the photopolymerization method, a certain amount heat is generated by UV radiation and the like, and some heat occurs as the polymerization reaction, an exothermal reaction, progresses. Therefore, the composition may additionally include the thermal polymerization initiator.

Any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, specific examples of the acyl phosphine include diphenyl(2,4,6-trimethylbenzoyl) phosphine oxide, phenylbis(2,4,6-trimethylbenzoyl)phosphine oxide, ethyl(2,4,6-trimethylbenzoyl)phenylphosphinate, and the like. More various photopolymerization initiators are well disclosed in "UV Coatings: Basics, Recent Developments and New Application (Elsevier, 2007)" written by Reinhold Schwalm, p 115, and the present disclosure is not limited thereto.

The photopolymerization initiator may be used in an amount of 0.001 to 1 parts by weight based on 100 parts by weight of the acrylic acid-based monomer. When the content of the photopolymerization initiator is less than 0.001 parts by weight, the polymerization rate may become slow, and when the content is more than 1 parts by weight, the molecular weight of the super absorbent polymer may become low and properties may be uneven. More specifically, the photopolymerization initiator may be used in an amount of 0.005 parts by weight or more, 0.01 parts by weight or more, or 0.1 parts by weight or more and 0.5 parts by weight or less, or 0.3 parts by weight or less based on 100 parts by weight of the acrylic acid-based monomer.

In the case of further including a thermal polymerization initiator as the polymerization initiator, one or more initiators selected from the group consisting of a persulfate-based initiator, an azo-based initiator, hydrogen peroxide, and ascorbic acid may be used as the thermal polymerization initiator. Specifically, sodium persulfate ($Na_2S_2O_8$), potassium persulfate ($K_2S_2O_8$), ammonium persulfate ($(NH_4)_2S_2O_8$), and the like may be used as examples of the persulfate-based initiators; and 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid), and the like may be used as examples of the azo-based initiators. More various thermal polymerization initiators are well disclosed in 'Principle of Polymerization (Wiley, 1981)' written by Odian, p 203, and the present disclosure is not limited thereto.

The thermal polymerization initiator may be included in an amount of 0.001 to 1 parts by weight based on 100 parts by weight of the acrylic acid-based monomer. When the thermal polymerization initiator is included in an amount of less than 0.001 parts by weight, additional thermal polymerization hardly occurs and there may be less effect of adding the thermal polymerization initiator. When the thermal polymerization initiator is included in an amount of more than 1 parts by weight, the molecular weight of the super absorbent polymer may become low and the properties may be uneven. More specifically, the thermal polymerization initiator may be included in an amount of 0.005 parts by weight or more, 0.01 parts by weight or more, or 0.1 parts by weight or more, and 0.5 parts by weight or less, or 0.3 parts by weight or less based on 100 parts by weight of the acrylic acid-based monomer.

Further, the monomer composition may further include an additive such as a surfactant, a thickener, a plasticizer, a preservation stabilizer, and an antioxidant, if necessary.

In addition, the monomer composition may be prepared in the form of a solution dissolved in a solvent.

At this time, any solvent which can dissolve the above components may be used without limitation. For example, the solvent may be in combination of at least one selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide. The solvent may be included in the monomer composition at a residual quantity except for the above components.

Next, step 2 of forming a hydrogel polymer by performing thermal polymerization or photopolymerization on the monomer composition is performed.

Herein, the thermal polymerization and photopolymerization methods are not particularly limited as long as they are commonly used methods capable of forming a hydrogel polymer by polymerizing the monomer composition.

For example, the photopolymerization may be performed by irradiating ultraviolet rays having an intensity of 3 to 30 mW, or 10 to 20 mW at a temperature of 60 to 90° C., or 70 to 80° C. In the case of photopolymerization under the above conditions, it is possible to form a polymer with superior polymerization efficiency.

In addition, the photopolymerization may be performed in a reactor equipped with a movable conveyor belt or in a stainless-steel container with a certain size. However, the above-described polymerization method is an example, and the present disclosure is not limited thereto.

Further, when the photopolymerization is performed in a reactor equipped with a movable conveyor belt as described above, the obtained hydrogel polymer may be usually a sheet-like hydrogel polymer having a width of the belt. In this case, the thickness of the polymer sheet may vary depending on the concentration, and injection speed of the monomer composition to be injected, and it is preferable to feed the monomer composition such that a sheet-like polymer having a thickness of about 0.5 to about 5 cm can be obtained. When the monomer mixture is fed such that the thickness of the sheet-like polymer becomes too thin, the production efficiency is low, which is undesirable. When the thickness of the sheet-like polymer is greater than 5 cm, the polymerization reaction cannot be evenly carried out over the entire thickness because of the excessive thickness.

The moisture content of the hydrogel polymer obtained in step 2 may be about 40 to about 80 wt % based on the total weight of the hydrogel polymer. Meanwhile, the "moisture content" in the present disclosure is the content of moisture in the entire weight of the hydrogel polymer, and it means a value of which the weight of the dried polymer is subtracted from the weight of the hydrogel polymer. Specifically, the moisture content is defined as a value calculated by the weight loss due to moisture evaporation from the polymer in the process of increasing the temperature of the polymer for drying through infrared heating. At this time, the drying conditions for measuring the moisture content are as follows: the temperature is increased to about 180° C. and maintained at 180° C., and the total drying time is 20 minutes including 5 minutes of a heating step.

Meanwhile, after the preparation of the hydrogel polymer, a coarse pulverization process of pulverizing the prepared hydrogel polymer before subsequent drying and pulverizing processes may be optionally performed.

The coarse pulverization process is a process for increasing drying efficiency in the subsequent drying process and controlling the particle size of the super absorbent polymer powder to be prepared, and the pulverizing machine used is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a meat chopper, and a disc cutter, but it is not limited thereto.

In the coarse pulverization process, the hydrogel polymer may be pulverized to have a diameter of about 1 to 10 mm. It is technically difficult to coarsely pulverize the hydrogel polymer to have a diameter of less than 1 mm because of its high moisture content, and there may be a phenomenon that the pulverized particles cohere with each other. Meanwhile, when the polymer is coarsely pulverized to have a diameter of larger than 10 mm, the efficiency enhancing effect in the subsequent drying step may be insignificant.

Subsequently, step 3 of forming a super absorbent polymer containing a polymer by drying, pulverizing and classifying the hydrogel polymer is performed.

The drying method is not particularly limited if it has been generally used in the drying process of the hydrogel polymer. Specifically, the drying step may be carried out by the method of hot air provision, infrared radiation, microwave radiation, UV ray radiation, and the like.

Specifically, the drying may be performed at about 150 to about 250° C. When the drying temperature is lower than about 150° C., the drying time may become excessively long and the properties of the super absorbent polymer finally prepared may decrease. And when the drying temperature is higher than about 250° C., only the surface of the polymer is excessively dried, a large amount of fines may be generated in the subsequent pulverization process, and properties of the super absorbent polymer finally prepared may decrease. Therefore, the drying may preferably be performed at a temperature of 150° C. or more, or 160° C. or more, and 200° C. or less, or 180° C. or less.

Meanwhile, the drying time may be about 20 to about 90 minutes in consideration of process efficiency, but it is not limited thereto.

The moisture content of the polymer after the drying step may be about 5 to about 10 wt %.

Meanwhile, a pulverization process is performed after the drying step. The pulverization process may be performed such that the particle diameter of the polymer powder, that is, the super absorbent polymer particles is about 150 to about 850 μm. In order to pulverize the polymer into such diameter, a pin mill, a hammer mill, a screw mill, a roll mill, a disc mill, or a jog mill may be used as the pulverizing machine, but the present disclosure is not limited thereto.

In addition, after the pulverization step, in order to control the properties of the super absorbent polymer powder to be finally commercialized, the pulverized polymer powder may be subjected to a classification process according to the particle diameter.

The super absorbent polymer obtained as a result of the above process may be in the form of fine powder containing a polymer in which an acrylic acid-based monomer and a polymerizable antimicrobial monomer are cross-linked and polymerized using an internal cross-linking agent. Specifically, the super absorbent polymer may be in the form of fine powder having a particle diameter of 150 to 850 μm.

Subsequently, the method may further include a surface cross-linking step of heat-treating the super absorbent polymer prepared in step 3 in the presence of a surface cross-linking agent. Through the above step, a super absorbent polymer further including a surface cross-linked layer formed by further cross-linking the polymer using a surface cross-linking agent on the polymer may be prepared. For details on the surface cross-linking agent, refer to the above.

The surface cross-linking is a step of increasing a cross-linking density near the surface of the super absorbent polymer with regard to a cross-linking density inside the particles. Generally, surface cross-linking agents are applied on the surface of the polymer. Therefore, surface cross-linking reactions occur on the surface of the polymer, which improves cross-linkability on the surface of the particles without substantially affecting the inside of the particles. Thus, the surface cross-linked super absorbent polymer has a higher degree of cross-linking at the surface than inside.

In addition, the surface cross-linking agent may be used in an amount of about 0.001 to about 5 parts by weight based on 100 parts by weight of the super absorbent polymer. For example, the surface cross-linking agent may be used in an amount of 0.005 parts by weight or more, 0.01 parts by weight or more, or 0.05 parts by weight or more, and 5 parts by weight or less, 4 parts by weight or less, or 3 parts by weight or less based on 100 parts by weight of the super absorbent polymer. When using the surface cross-linking agent within the above-described range, it is possible to prepare a super absorbent polymer having excellent absorption-related physical properties.

In addition, the method of mixing the surface cross-linking agent with the super absorbent polymer is not particularly limited. For example, a method of adding the surface cross-linking agent and the super absorbent polymer in a reactor for mixing, a method of spraying the surface cross-linking agent onto the super absorbent polymer, or a method of mixing the super absorbent polymer and the surface cross-linking agent while continuously providing them to a continuously operating mixer may be used.

The surface cross-linking may be performed by heating the super absorbent polymer at a temperature of about 80 to about 220° C. for about 15 to about 100 minutes with the above-described surface cross-linking agent. When the cross-linking temperature is less than 80° C., the surface cross-linking reaction may not sufficiently occur, and when it exceeds 220° C., the surface cross-linking reaction may proceed excessively. In addition, when the cross-linking time is too short (less than 15 minutes), the cross-linking reaction may not sufficiently occur, and when the cross-linking time exceeds 100 minutes, the cross-linking density on the particle surface may become excessively high due to excessive surface cross-linking, which may cause deterioration in physical properties. More specifically, it may be performed by heating at a temperature of 120° C. or higher, or 140° C. or higher, and 200° C. or lower, or 180° C. or lower for 20 minutes or more, or 40 minutes or more, and 70 minutes or less, or 60 minutes or less.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto.

Meanwhile, a hygienic product including the above-described super absorbent polymer is further provided.

Hereinafter, the present invention will be described in more detail with reference to examples. However, these examples are for illustrative purposes only, and the invention is not intended to be limited by these examples.

Preparation Example A: Preparation of Polymerizable Antimicrobial Monomer 1-1 (3-(acryloyloxy)benzoic acid)

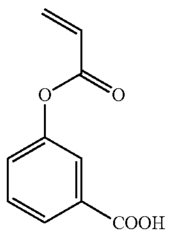

A solution of 26.67 g of 3-hydroxybenzoic acid and 15.63 g of NaOH dissolved in 100 mL of water was placed in a 250 ml round bottom flask, and a solution of 19.39 g of acryloyl chloride dissolved in 50 mL of 1,4-dioxane was added thereto. At this time, the addition was performed slowly drop by drop using a dropping funnel at 0° C. When the addition of the 1,4-dioxane solution in which acryloyl chloride was dissolved was completed, the reaction was carried out with stirring at room temperature for 4 hours. After the reaction, hydrochloric acid was added until the pH of the reaction solution reached 2 to 3 to obtain a liquid product. The obtained liquid product was dissolved in a methylene chloride (MC) solvent, and then water was added thereto to perform extraction. Thereafter, it was recrystallized with water to obtain the title compound, polymerizable antimicrobial monomer 1-1, in the form of solid. Meanwhile, $^1H$ NMR spectrum of the obtained polymerizable antimicrobial monomer 1-1 is shown in FIG. 1.

$MS[M+H]^+=193$ $^1H$ NMR (500 MHz, DMSO-$d_6$, δ [ppm]): 6.1 (dd, 1H, $CH_2{=}CH$), 6.3 (dd, 1H, $CH_2{=}CH$), 6.5 (dd, 1H, $CH_2{=}CH$), 7.4 (d, 1H, Ar—H), 7.5 (d, 1H, Ar—H), 7.6 (d, 1H, Ar—H), 7.8 (d, 1H, Ar—H), 13.1 (s, 1H, COOH).

Examples—Preparation of Super Absorbent Polymer Composition

Example 1

(Step 1) In a 3 L glass vessel equipped with a stirrer, nitrogen inlet, and thermometer, 100 g of acrylic acid, 0.25 g of polyethylene glycol diacrylate (Mn=575) as an internal cross-linking agent, 0.00625 g of bis(2,4,6-trimethylbenzoyl)-phenylphosphine oxide as a photoinitiator, 0.125 g of sodium persulfate (SPS) as a thermal initiator, 100 g of 40% sodium hydroxide solution and 0.5 g of the polymerizable antimicrobial monomer 1-1 prepared in Preparation Example A were added while continuously adding nitrogen, thereby preparing a monomer composition. At this time, the degree of neutralization of the acrylic acid and the polymerizable antimicrobial monomer 1-1 was 70 mol %.

(Step 2) Then, the monomer composition was added to a stainless steel container having a width of 250 mm, a length of 250 mm, and a height of 30 mm, and irradiated with ultraviolet rays in a UV chamber at 80° C. for 60 seconds (irradiation amount: 10 $mV/cm^2$), followed by aging for 2 minutes to prepare a sheet-type hydrogel polymer.

(Step 3) The prepared hydrogel polymer was cut to a size of 3 cm*3 cm, and then put in a meat chopper for pulverization to obtain hydrogel particle crumb having a size of 1 mm to 10 mm. The obtained crumb was spread to a thickness of about 30 mm on stainless steel wire gauze having a pore size of 600 μm, and dried in a hot air oven at 120° C. for 11 hours. The dried polymer thus obtained was pulverized using a pulverizing machine, and classified with a ASTM standard mesh to obtain a base resin having a particle diameter of 150 μm to 850 μm, which was used as a super absorbent polymer.

Example 2

A super absorbent polymer was prepared in the same manner as in Example 1, except that 1.0 g of the polymerizable antimicrobial monomer 1-1 prepared in Preparation Example A was used in Example 1.

Example 3

A super absorbent polymer was prepared in the same manner as in Example 1, except that 1.5 g of the polymerizable antimicrobial monomer 1-1 prepared in Preparation Example A was used in Example 1.

Example 4

A super absorbent polymer was prepared in the same manner as in Example 1, except that 2.0 g of the polymerizable antimicrobial monomer 1-1 prepared in Preparation Example A was used in Example 1.

Comparative Example 1

A super absorbent polymer was prepared in the same manner as in Example 1, except that the polymerizable antimicrobial monomer 1-1 was not used in Example 1.

Comparative Example 2

A super absorbent polymer was prepared in the same manner as in Example 1, except that 0.1 g of the polymerizable antimicrobial monomer 1-1 was used in Example 1.

Comparative Example 3

A super absorbent polymer was prepared in the same manner as in Example 1, except that 100 g of the polymerizable antimicrobial monomer 1-1 was used in Example 1.

Comparative Example 4

A super absorbent polymer was prepared in the same manner as in Example 1, except that 30 g of the polymerizable antimicrobial monomer 1-1 was used in Example 1.

Experimental Example 1

The physical properties of the super absorbent polymers prepared in Examples and Comparative Examples were evaluated in the following manner, and the results are shown in Table 4 below.

Unless otherwise indicated, all procedures were conducted in a constant temperature and humidity room (23±1° C., relative humidity of 50±10%), and physiological saline or saline means a 0.9 wt % sodium chloride (NaCl) aqueous solution.

(1) Evaluation of Antimicrobial Activity Against *E. coli*

After putting 2 g of the super absorbent polymer prepared in one of Examples and Comparative Examples into a 250 cell culture flask, 50 ml of synthetic urine inoculated with *E. coli* (ATCC 25922), a test microorganism, at 3000±300 CFU/ml was injected. Then, the super absorbent polymer was mixed for about 1 minute to sufficiently absorb the synthetic urine solution, and the polymer in which the solution was sufficiently absorbed was in the form of gel, which was incubated for 12 hours in an incubator (manufactured by JEIO TECH) maintained at 35° C. 150 mL of 0.9 wt % NaCl solution was added to the incubated sample, shaken for about 1 minute, and the diluted solution was spread on an Agar medium plate. Afterwards, serial dilution was performed to enable colony counting, and 0.9 wt % NaCl solution was used in this process. For bacteriostatic performance, the bacteriostatic reduction rate (%) of *E. coli* (ATCC 25922) was calculated according to the following Equation 1 after calculating the initial concentration of microorganisms (Co, CFU/mL) in consideration of the dilution concentration, and the results are shown in Table 4 below.

$$\text{Bacteriostatic reduction rate (\%)} = \left(1 - \frac{C_{sample}}{C_{Reference}}\right) \times 100 \quad \text{[Equation 1]}$$

in the above Equation, $C_{sample}$ is a concentration of microorganisms (Co) in the culture medium of the super absorbent polymer containing bacteriostatic substances, and $C_{Reference}$ is a concentration of microorganisms (Co) in the culture medium of the super absorbent polymer of Comparative Example 1 containing no bacteriostatic substance.

At this time, synthetic urine used for the evaluation of antimicrobial activity was prepared as follows.

First, a stock solution was prepared by putting the reagents listed in Table 1 in the following weight in a 1000 mL flask, filling water up to 1000 mL, and then mixing. Then, a cationic solution was prepared by putting the reagents listed in Table 2 in the following weight in a 100 mL flask, filling water up to 20 mL, and then mixing. Thereafter, a Urea/glucose solution was prepared by putting the reagents listed in Table 3 in the following weight in a 100 mL flask, filling water up to 100 mL, and then mixing.

Subsequently, the prepared stock solution and cationic solution were sterilized at 120° C. for 15 minutes using an autoclave, and cooled sufficiently to room temperature. Then, the prepared Urea/glucose solution was treated with a 0.22 μm syringe filter (Hydrophilic, manufactured by Sartorius stedim) to remove impurities.

Thereafter, 940 mL of stock solution, 10 mL of cationic solution, and 50 mL of urea/glucose solution were sufficiently mixed to prepare synthetic urine. The prepared synthetic urine is usually stored in a refrigerator and can be used for 2 weeks, and the synthetic urine after 2 weeks was not used in the experiment.

TABLE 1

Stock solution

| Reagent | weight (g) |
|---|---|
| Sodium chloride | 8.7660 |
| Potassium phosphate dibasic trihydrate | 4.5644 |
| Sodium dihydrogen phosphate (dihydrate) | 1.5602 |
| Ammonium chloride | 2.6745 |
| Sodium sulfate decahydrate | 6.4440 |
| Lactic acid (85% in $H_2O$) | 0.5299 |
| Yeast extract | 20.0000 |

TABLE 2

Cationic solution

| Reagent | weight (g) |
|---|---|
| Magnesium chloride(hexahydrate) | 1.2198 |
| Calcium chloride (dihydrate) | 0.8821 |

TABLE 3

Urea/glucose solution

| Reagent | weight (g) |
|---|---|
| Urea | 36.0360 |
| D-glucose | 0.1802 |

(2) Centrifuge Retention Capacity (CRC)

The centrifuge retention capacity by absorption ratio under a non-loading condition of the super absorbent polymer prepared in one of Examples and Comparative Examples was measured in accordance with EDANA (European Disposables and Nonwovens Association, EDANA) WSP 241.3.

Specifically, after inserting $W_0$ (g, about 0.2 g) of the super absorbent polymer uniformly in a nonwoven fabric envelope and sealing the same, it was soaked in physiological saline (0.9 wt % sodium chloride aqueous solution) at room temperature. After 30 minutes, the envelope was centrifuged at 250 G for 3 minutes to drain, and the weight $W_2$ (g) of the envelope was measured. Further, after carrying out the same operation without using the polymer, the weight $W_1$ (g) of the envelope was measured. Then, CRC (g/g) was calculated using the obtained weight values according to the following Equation, and the results are shown in Table 1 below.

$$\text{CRC (g/g)}=\{[W_2(g)-W_1(g)]/W_0(g)\}-1 \quad \text{[Equation 2]}$$

in Equation 2, $W_0$ (g) is an initial weight (g) of the super absorbent polymer, $W_1$ (g) is a weight of an envelope measured after immersing the envelope containing no super absorbent polymer into physiological saline for 30 minutes and dehydrating the same by using a centrifuge at 250 G for 3 min, and $W_2$ (g) is a weight of an envelope containing a super absorbent polymer measured after immersing the super absorbent polymer into physiological saline for 30 minutes at room temperature and dehydrating the same by using a centrifuge at 250 G for 3 min.

TABLE 4

| | | | Antimicrobial activity against *E. coli* | | | Physical properties of super absorbent |
|---|---|---|---|---|---|---|
| | Type of antimicrobial monomer | Content of antimicrobial monomer[1)] | CFU/mL SUE | Log CFU/mL SUE | Bacteriostatic reduction rate (%) | polymer CRC (g/g) |
| Example 1 | 1-1 | 0.5 | 5.2E+02 | 2.72 | 99.80 | 35.7 |
| Example 2 | 1-1 | 1.0 | 4.9E+02 | 2.69 | 99.84 | 35.2 |
| Example 3 | 1-1 | 1.5 | 3.2E+02 | 2.51 | 99.90 | 35.3 |
| Example 4 | 1-1 | 2.0 | 3.1E+02 | 2.49 | 99.90 | 35.2 |
| Comparative Example 1 | 1-1 | — | 3.0E+05 | 5.48 | 0 | 35.7 |
| Comparative Example 2 | 1-1 | 0.1 | 4.6E+05 | 5.66 | 0 | 36.0 |

TABLE 4-continued

| | Type of antimicrobial monomer | Content of antimicrobial monomer[1] | Antimicrobial activity against *E. coli* CFU/mL SUE | Log CFU/mL SUE | Bacteriostatic reduction rate (%) | Physical properties of super absorbent polymer CRC (g/g) |
|---|---|---|---|---|---|---|
| Comparative Example 3 | 1-1 | 100 | 3.5E+01 | 1.54 | 99.99 | 16.2 |
| Comparative Example 4 | 1-1 | 30 | 7.4E+01 | 1.87 | 99.99 | 30.2 |

[1]in parts by weight based on 100 parts by weight of acrylic acid

Referring to Table 4, the super absorbent polymer of Examples had centrifuge retention capacity (CRC) equivalent to that of the super absorbent polymer of Comparative Example 1 containing no polymerizable antimicrobial monomer, and exhibited excellent antimicrobial activity against *Escherichia coli*, which is one of the Gram-negative bacteria.

Meanwhile, it was confirmed that the super absorbent polymer of Comparative Example 2 in which the polymerizable antimicrobial monomer is included in the polymer in an amount of less than 0.2 parts by weight based on 100 parts by weight of the acrylic acid monomer did not exhibit antimicrobial activity against *Escherichia coli*. It was also confirmed that the super absorbent polymer of Comparative Example 3 in which the polymerizable antimicrobial monomer is included in the polymer in an amount of more than 20 parts by weight based on 100 parts by weight of the acrylic acid monomer had significantly lowered centrifuge retention capacity (CRC) compared to the super absorbent polymer of Comparative Example 1.

Accordingly, it was confirmed that the super absorbent polymers of Examples containing a polymerizable antimicrobial monomer in the polymer in a predetermined amount exhibited excellent antimicrobial activity while having the centrifuge retention capacity (CRC) to saline (0.9 wt % aqueous solution of sodium chloride) for 30 minutes measured in accordance with the EDANA WSP 241.3 of 31 to 40 g/g.

The invention claimed is:

1. A super absorbent polymer comprising:

a polymer of an acrylic acid-based monomer containing acidic groups in which at least a portion of the acidic groups is neutralized; a polymerizable antimicrobial monomer represented by the following Chemical Formula 1; and an internal cross-linking agent, wherein the polymerizable antimicrobial monomer is included in the polymer in an amount of 0.2 to 20 parts by weight based on 100 parts by weight of the acrylic acid-based monomer;

[Chemical Formula 1]

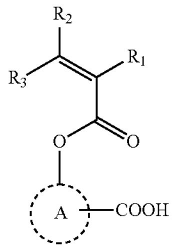

in the Chemical Formula 1, $R_1$ to $R_3$ are each independently hydrogen or methyl, and A is a substituted or unsubstituted C6 to C60 aromatic ring.

2. The super absorbent polymer of claim 1, wherein the polymerizable antimicrobial monomer is included in the polymer in an amount of 0.5 to 2 parts by weight based on 100 parts by weight of the acrylic acid-based monomer.

3. The super absorbent polymer of claim 1, wherein in the Chemical Formula 1, A is a benzene ring unsubstituted or substituted with at least one substituent selected from the group consisting of a C1 to C4 alkyl group, a hydroxyl group and a carboxyl group.

4. The super absorbent polymer of claim 1, wherein the polymerizable antimicrobial monomer is any one selected from the group consisting of:

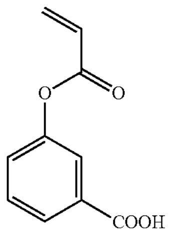

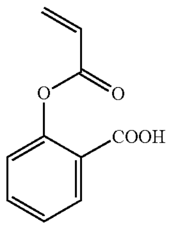

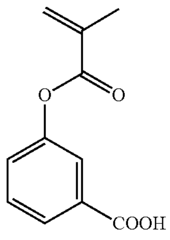

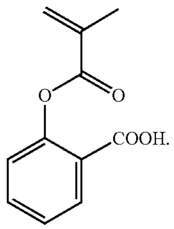

5. The super absorbent polymer of claim 1, further comprising a surface cross-linked layer formed by further cross-linking the polymer using a surface cross-linking agent on the polymer.

6. The super absorbent polymer of claim 1, wherein the super absorbent polymer exhibits antimicrobial activity against at least one of Gram-negative bacteria and Gram-positive bacteria.

7. The super absorbent polymer of claim 6, wherein the Gram-negative bacteria is *Proteus mirabilis*, or *Escherichia coli*, and the Gram-positive bacteria is *Enterococcus faecalis*.

8. The super absorbent polymer of claim 1, wherein the super absorbent polymer has centrifuge retention capacity (CRC) to saline (0.9 wt % aqueous solution of sodium chloride) for 30 minutes measured in accordance with the EDANA WSP 241.3 of 31 to 40 g/g.

9. A preparation method of a super absorbent polymer, comprising:

preparing a monomer composition by mixing an acrylic acid-based monomer containing an acidic group, a polymerizable antimicrobial monomer represented by the following Chemical Formula 1, a basic material, an internal cross-linking agent, and a polymerization initiator;

forming a hydrogel polymer by performing thermal polymerization or photopolymerization on the monomer composition; and forming a super absorbent polymer containing a polymer by drying, pulverizing and classifying the hydrogel polymer, wherein the polymerizable antimicrobial monomer is used in an amount of 0.2 to 20 parts by weight based on 100 parts by weight of the acrylic acid-based monomer:

[Chemical Formula 1]

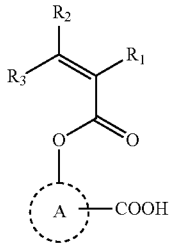

in the Chemical Formula 1, $R_1$ to $R_3$ are each independently hydrogen or methyl, and A is a substituted or unsubstituted C6 to C60 aromatic ring.

10. The preparation method of a super absorbent polymer of claim 9, wherein a degree of neutralization of the acrylic acid-based monomer and the polymerizable antimicrobial monomer in the monomer composition is each independently 40 to 95 mol %.

11. The preparation method of a super absorbent polymer of claim 9, further comprising surface cross-linking by heat-treating the super absorbent polymer in the presence of a surface cross-linking agent.

12. A hygienic product comprising the super absorbent polymer according to claims 1.

* * * * *